US012594975B2

(12) United States Patent
Prix et al.

(10) Patent No.: US 12,594,975 B2
(45) Date of Patent: Apr. 7, 2026

(54) CARRIER ASSEMBLY FOR A CHASSIS OF A RAIL VEHICLE

(71) Applicant: Siemens Mobility Austria GmbH, Vienna (AT)

(72) Inventors: Alexander Prix, Graz (AT); Christian Moser, Graz (AT); Radovan Seifried, Maribor (SI)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 807 days.

(21) Appl. No.: 17/915,895

(22) PCT Filed: Mar. 25, 2021

(86) PCT No.: PCT/EP2021/057763
§ 371 (c)(1),
(2) Date: Sep. 29, 2022

(87) PCT Pub. No.: WO2021/198021
PCT Pub. Date: Oct. 7, 2021

(65) Prior Publication Data

US 2023/0202536 A1 Jun. 29, 2023

(30) Foreign Application Priority Data

Mar. 31, 2020 (AT) .............................. A 50266/2020

(51) Int. Cl.
*B61F 5/52* (2006.01)
*H01Q 1/32* (2006.01)

(52) U.S. Cl.
CPC *B61F 5/52* (2013.01); *H01Q 1/32* (2013.01)

(58) Field of Classification Search
CPC ..... H01Q 1/32; B61F 1/08; B61F 1/14; B61F 5/50; B61F 5/52; B61F 99/00
(Continued)

(56) References Cited

U.S. PATENT DOCUMENTS 6,079,335 A 6/2000 Polley
7,004,078 B2 2/2006 Nishimura et al.
(Continued)

FOREIGN PATENT DOCUMENTS

CN 202094272 12/2011
CN 105216823 1/2016
(Continued)

OTHER PUBLICATIONS

PCT International Search Report dated Jun. 29, 2021 based on PCT/EP2021/057763 filed Mar. 21, 2021.

*Primary Examiner* — S. Joseph Morano
*Assistant Examiner* — Heaven R Buffington
(74) *Attorney, Agent, or Firm* — Cozen O'Connor

(57) ABSTRACT

A carrier assembly for a chassis of a rail vehicle, i.e., for a vehicle-side, railway safety or control device, i.e., an antenna carrier assembly connectable to a chassis frame, includes a carrier device that is connectable in an articulated and elastic manner to at least one first longitudinal member of the chassis frame and is additionally supportable in an articulated and elastic manner on at least the chassis frame or at least one further chassis component, wherein the carrier device is connectable to the at least first longitudinal member via a pendulum support, and the carrier device is L-shaped, where a first limb of the carrier device can be connected to the at least first longitudinal member via the pendulum support such that a stable mounting of the carrier device is made possible and stress is relieved from the chassis frame when the carrier device is connected to the chassis frame.

19 Claims, 3 Drawing Sheets

(58) Field of Classification Search
USPC ............ 105/136, 138, 167, 172, 173, 182.1, 105/199.1, 200, 463.1
See application file for complete search history.

(56) References Cited

U.S. PATENT DOCUMENTS

| | | | | |
|---|---|---|---|---|
| 10,745,035 | B2 | 8/2020 | Brandstetter et al. | |
| 2004/0123767 | A1 | 7/2004 | Nishimura et al. | |
| 2018/0043909 | A1 | 2/2018 | Brandstetter et al. | |
| 2019/0329659 | A1* | 10/2019 | Tamura | B61F 5/302 |

FOREIGN PATENT DOCUMENTS

| | | |
|---|---|---|
| CN | 204956505 | 1/2016 |
| CN | 106043343 | 10/2016 |
| EP | 1415882 | 5/2004 |
| EP | 3243724 | 11/2017 |
| WO | 2016131691 | 8/2016 |

* cited by examiner

CARRIER ASSEMBLY FOR A CHASSIS OF A RAIL VEHICLE

CROSS-REFERENCE TO RELATED APPLICATIONS

This is a U.S. national stage of application No. PCT/EP2021/057763 filed 25 Mar. 2021. Priority is claimed on Austrian Application No. A50266/2020 filed 31 Mar. 2020, the content of which is incorporated herein by reference in its entirety.

BACKGROUND OF THE INVENTION

1. Field of the Invention

The invention relates to a carrier assembly for a bogie of a rail vehicle, in particular for a vehicle-side, railway safety or control facility, in particular an antenna carrier assembly, connectable to a bogie frame.

2. Description of the Related Art

In rail vehicles, it is often necessary to arrange certain vehicle-side facilities close to a track or railway infrastructure to ensure an interaction between the rail vehicle and the track or the railway infrastructure, perform measurements on tracks, and to transfer data between the rail vehicle and infrastructure-side facilities (for example, via radio), etc.

Carrier assemblies are often provided for this purpose, which are, for example, rigidly connected to a bogie frame of a bogie of a rail vehicle, as a result of which, however, large dynamic forces can be introduced into the bogie frame and a strong vibration excitation can occur.

The carrier assembly itself and components that are connected to the carrier assembly sometimes have high masses and frequently load the bogie frame to a great extent.

Furthermore, for example, antennas of a train control system must often be arranged at a specific position on the carrier assembly (for example, in the middle) in order, for example, to enable data transfer with an infrastructure-side balise in the track center.

CN 110733525 A, for example discloses carrier assemblies for antennas. These carrier assemblies are connected to longitudinal members of a bogie frame of a bogie of a rail vehicle and comprise curved rods that enable an arrangement of the antennas in the region in front of wheels of the bogie, where the arrangement is mounted upstream of the bogie. However, it is not clear to what extent the carrier assembly is designed to also arrange antennas further away from the wheels (for example, in the direction of the center of the bogie).

EP 3 243 724 A1 discloses a bogie for a rail vehicle, where an adapter is mounted on a bogie frame and a wheel, on which adapter, for example, current collectors or train protection antennas can be arranged. Here, the adapter is provided laterally on the bogie. It is not clear to what extent the adapter is also suitable for components that are to be arranged, for example, in a region upstream of the bogie.

SUMMARY OF THE INVENTION

In view of the foregoing, it is therefore an object of the invention to provide a distance-bridging carrier assembly, which is improved in relation to the prior art, with mechanical decoupling with respect to the bogie frame.

This and other objects and advantages are achieved in accordance with the invention by a carrier assembly, in which a carrier apparatus is provided, which can be connected in an articulated and elastic manner to at least one first longitudinal member of the bogie frame and can additionally be supported in an articulated and elastic manner at least on the bogie frame or on at least one further bogie component, where the carrier apparatus can be connected to the at least one first longitudinal member via a pendulum support and the carrier apparatus is L-shaped, where a first leg of the carrier apparatus can be connected to the at least one first longitudinal member by means of the pendulum support.

As a result of this measure, when the carrier apparatus is connected to the bogie frame, the bogie frame can have a lighter construction because the carrier apparatus is loaded mechanically, in particular dynamically, only moderately owing to an elastic mounting on the first longitudinal member.

Furthermore, when the carrier apparatus is supported on the bogie frame or the further bogie component, a distributed introduction of force into the bogie is achieved owing to this support and the carrier apparatus is held in position.

A low vibration excitation is achieved via the inventive carrier assembly. When the carrier assembly is connected to the bogie, dynamically effective moments of inertia about the pivot point of the bogie are kept low owing to the mounting of the carrier apparatus on the first longitudinal member and owing to the additional support of the carrier apparatus on the bogie frame or the further bogie component, as a result of which driving-dynamic improvements are achieved. Furthermore, relative movements occurring owing to the pendulum support are compensated between the bogie frame and the carrier apparatus.

When the first leg is connected to the first longitudinal member via the pendulum support, an L-shaped configuration of the carrier apparatus results in great stability and in advantageous strength properties of the carrier apparatus.

Furthermore, it is helpful if the first leg is tubular and is permanently connected to a second leg of the carrier apparatus designed as a rocker. As a result of this measure, a mass reduction of the carrier apparatus is effected without substantially influencing the advantageous strength properties of the carrier apparatus.

In order to hold the carrier apparatus in position, it is advantageous if the carrier apparatus can be supported on at least one first wheel set bearing housing of the bogie via at least one first support.

Alternatively, however, it can also be advantageous if the carrier apparatus can be supported on a crossmember of the bogie frame by means of at least one first support.

A further alternative solution for supporting the carrier apparatus is achieved if the carrier apparatus can be supported on an anti-roll support of the rail vehicle via at least one first support. If the first wheel set bearing housing or the anti-roll support is provided as a further bogie component upon which the carrier apparatus can be supported, then a relief of the bogie frame is effected.

In order to be able to guide the first support, for example, under a wheel set, under a drive motor, and/or a transmission, to the bogie frame or to the further bogie component, it is helpful if the at least first support is angled or curved.

An additional stabilization with simultaneous mechanically decoupled mounting of the inventive carrier assembly is made possible if the carrier apparatus can be connected in an articulated and elastic manner to a second longitudinal member of the bogie frame, where it is possible for a second leg of the carrier apparatus to be connected to the second longitudinal member via an elastic element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be illustrated in more detail below with reference to exemplary embodiments, in which.

DETAILED DESCRIPTION OF THE EXEMPLARY EMBODIMENTS

Figure 1:
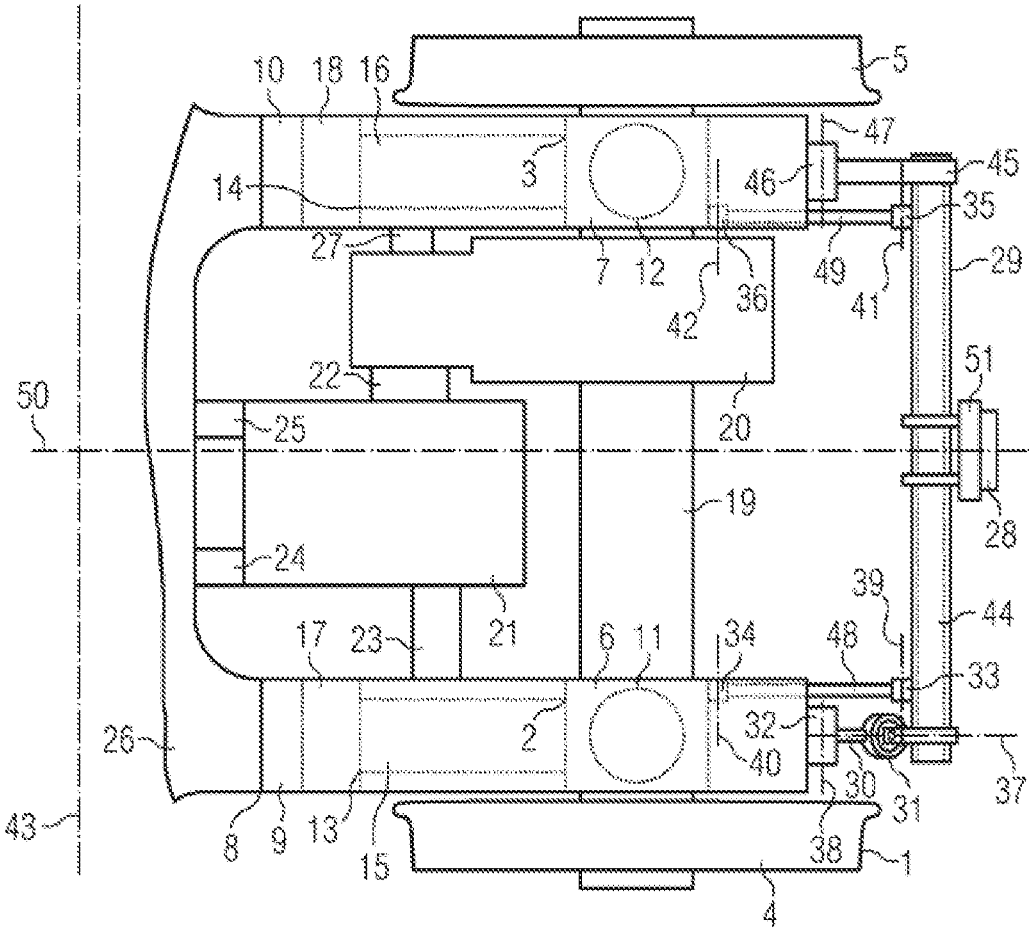
FIG. 1 shows a detail of a bogie of a rail vehicle in a schematic plan view with an exemplary first embodiment of an inventive carrier assembly, which is supported on wheel set bearing housings.

FIG. 1 shows a plan view of a bogie of a rail vehicle in a schematic representation of a detail. Here, the bogie has a first wheel set 1 as well as a second wheel set not visible in FIG. 1. The first wheel set 1 is internally mounted, i.e., a first wheel set bearing apparatus 2 and a second wheel set bearing apparatus 3 of the first wheel set 1 are arranged within a region delimited by a first wheel 4 and a second wheel 5 of the first wheel set 1.

The second wheel set is structurally identical to the first wheel set 1 and is likewise designed as an internally mounted wheel set.

The first wheel set bearing apparatus 2 and the second wheel set bearing apparatus 3 comprise wheel set bearings of the first wheel set 1. Furthermore, the first wheel set bearing apparatus 2 has a first wheel set bearing housing 6, and the second wheel set bearing apparatus 3 has a second wheel set bearing housing 7. A bogie frame 8 is coupled to the first wheel set 1 and the second wheel set.

For connecting the first wheel set 1 to the bogie frame 8, a first primary spring 11 is provided between a first longitudinal member 9 of the bogie frame 8 and the first wheel set bearing housing 6, and a second primary spring 12 is provided between a second longitudinal member 10 of the bogie frame 8 and the second wheel set bearing housing 7.

Furthermore, for coupling the first wheel set 1 to the bogie frame 8 between the first longitudinal member 9 and the first wheel set 1, a first wheel set guide apparatus 13 is provided, between the second longitudinal member 10 and the first wheel set 1 a second wheel set guide apparatus 14. The first wheel set guide apparatus 13 has a first swing arm 15 and a first wheel set guide bush 17. The first swing arm 15 is formed in one piece with the first wheel set bearing housing 6. The first swing arm 15 is coupled to the bogie frame 8 via the first wheel set guide bush 17.

The second wheel set guide apparatus 14 is structurally identical to the first wheel set guide apparatus 13 and comprises a second swing arm 16 and a second wheel set guide bush 18, via which the second swing arm 16 is connected to the bogie frame 8. The second wheel set is connected to the bogie frame 8 in accordance with the same principle as the first wheel set 1.

A first transmission 20 is connected to a wheel set shaft 19 of the first wheel set 1, as a result of which drive forces and torques are transmitted from an electric first drive motor 21 via a first coupling 22, which is interposed between the first drive motor 21 and the first transmission 20, and the first transmission 20 to the first wheel set 1. The drive motor 21 is connected to the first longitudinal member 9 via a first engine mount 23 and to a crossmember 26 of the bogie frame 8 via a second engine mount 24 and a third engine mount 25. The first transmission 20 is connected to the second longitudinal member 10 via a transmission torque support 27.

The bogie has a second drive motor, a second transmission and a second coupling, which are not visible in FIG. 1 and are configured in accordance with the same principles as the first drive motor 21, the first transmission 20 and the first coupling 22 and are connected to one another and to the bogie frame 8 and the second wheel set.

An exemplary first embodiment of an inventive carrier assembly for an antenna 28 of a train control system, i.e., a vehicle-side, railway safety facility, is connected to the bogie.

The carrier assembly is accordingly formed as an antenna carrier assembly and has a carrier apparatus 29 formed as an antenna carrier. The carrier apparatus 29 is connected in an articulated and elastic manner to the first longitudinal member 9 and in an articulated and elastic manner to the second longitudinal member 10.

A pendulum support 30 made of steel is arranged between the carrier apparatus 29 and the first longitudinal member 9. The pendulum support 30 is connected to the carrier apparatus 29 via a first pivot joint 31 and to the first longitudinal member 9 via a second pivot joint 32.

The first pivot joint 31 and the second pivot joint 32 are configured as bush-shaped metal-elastomer elements, which in particular have an elastic behavior in the direction of their joint longitudinal axes and radially with respect to their joint longitudinal axes.

A first joint longitudinal axis 37 of the first pivot joint 31 is arranged at a right angle to a second joint longitudinal axis 38 of the second pivot joint 32. The second joint longitudinal axis 38 is oriented parallel to a bogie transverse axis 43. The carrier apparatus 29 is thus connected to the first longitudinal member 9 in an articulated manner with respect to the bogie transverse axis 43.

The carrier apparatus 29 is L-shaped, with a first leg 44 of the carrier apparatus 29 being connected to the first longitudinal member 9 via the pendulum support 30 and a second leg 45 of the carrier apparatus 29 being connected to the second longitudinal member 10 via an elastic element 46.

The elastic element 46 is configured as a bush-shaped metal-elastomer element and has an elastic behavior in the direction of its elastic element longitudinal axis 47 and radially with respect to its elastic element longitudinal axis 47. The elastic element longitudinal axis 47 is oriented parallel to the bogie transverse axis 43. The carrier apparatus 29 is thus connected in an articulated manner to the second longitudinal member 10 with respect to the bogie transverse axis 43.

The first leg 44 is tubular and is welded to the second leg 45, which is formed as a rocker, i.e., is permanently connected to the second leg 45. The second leg 45 is cylindrical in the region of the first leg 44 and tapers in the direction of the second longitudinal member 10. The first leg 44 and the second leg 45 are made of steel.

In this exemplary first embodiment of an inventive carrier assembly, the carrier apparatus 29 is additionally not supported on the bogie frame 8, but rather is supported in an articulated and elastic manner on the first wheel set bearing housing 6 and the second wheel set bearing housing 7, i.e., on further bogie components.

For this purpose, a first support 48 is arranged between the first leg 44 of the carrier apparatus 29 and the first wheel set bearing housing 6, and a second support 49 is arranged between the first leg 44 and the second wheel set bearing housing 7. The first support 48 and the second support 49 are made of steel and oriented parallel to a bogie longitudinal axis 50. The carrier apparatus 29 is thus supported on the first wheel set bearing housing 6 and on the second wheel set bearing housing 7 in the direction of the bogie longitudinal axis 50.

The first support 48 has a third pivot joint 33 at its first end and a fourth pivot joint 34 at its second end, with the first support 48 being coupled to the carrier assembly 29 via the third pivot joint 33 and to the first wheel set bearing housing 6 via the fourth pivot joint 34.

The second support 49 is structurally identical to the first support 48 and is connected to the carrier apparatus 29 via a fifth pivot joint 35 and is coupled to the second wheel set bearing housing 7 via a sixth pivot joint 36.

The third pivot joint 33, the fourth pivot joint 34, the fifth pivot joint 35 and the sixth pivot joint 36 are configured as bush-shaped metal-elastomer elements and have elastic behavior in the direction of their joint longitudinal axes as well as radially with respect to their joint longitudinal axes.

A third joint longitudinal axis 39 of the third pivot joint 33, a fourth joint longitudinal axis 40 of the fourth pivot joint 34, a fifth joint longitudinal axis 41 of the fifth pivot joint 35 and a sixth joint longitudinal axis 42 of the sixth pivot joint 36 are oriented parallel to the bogie transverse axis 43.

The carrier apparatus 29 is thus supported in an articulated manner with respect to the bogie transverse axis 43 on the first wheel set bearing housing 6 and on the second wheel set bearing housing 7.

A holder 51 is welded to the first leg 44 of the carrier apparatus 29, and the holder 51 is in turn connected to the antenna 28 of the train control system, which in this exemplary first embodiment of an inventive carrier assembly is set up as a European Train Control System (ETCS). The holder 51 and the antenna 28 are arranged centrally in respect of a track (not shown).

The bogie of FIG. 1 is configured as an internally mounted bogie. Inventively, however, it should be understood it is conceivable to also use the inventive carrier assembly for an externally mounted bogie. Furthermore, it is conceivable that, for example, a sensor or sensors of a diagnosis or monitoring system is or are connected to the carrier apparatus 29 (for example, a camera for detecting track damage, etc.).

Furthermore, it is conceivable that the carrier apparatus 29 is not connected to the second longitudinal member 10 or to the first longitudinal member 9 and/or is not supported on the second wheel set bearing housing 7 or on the first wheel set bearing housing 6. With such a embodiment of an inventive carrier assembly, for example, a sanding apparatus or a sanding tube or a cow-catcher, etc. can be connected.

Figure 2:
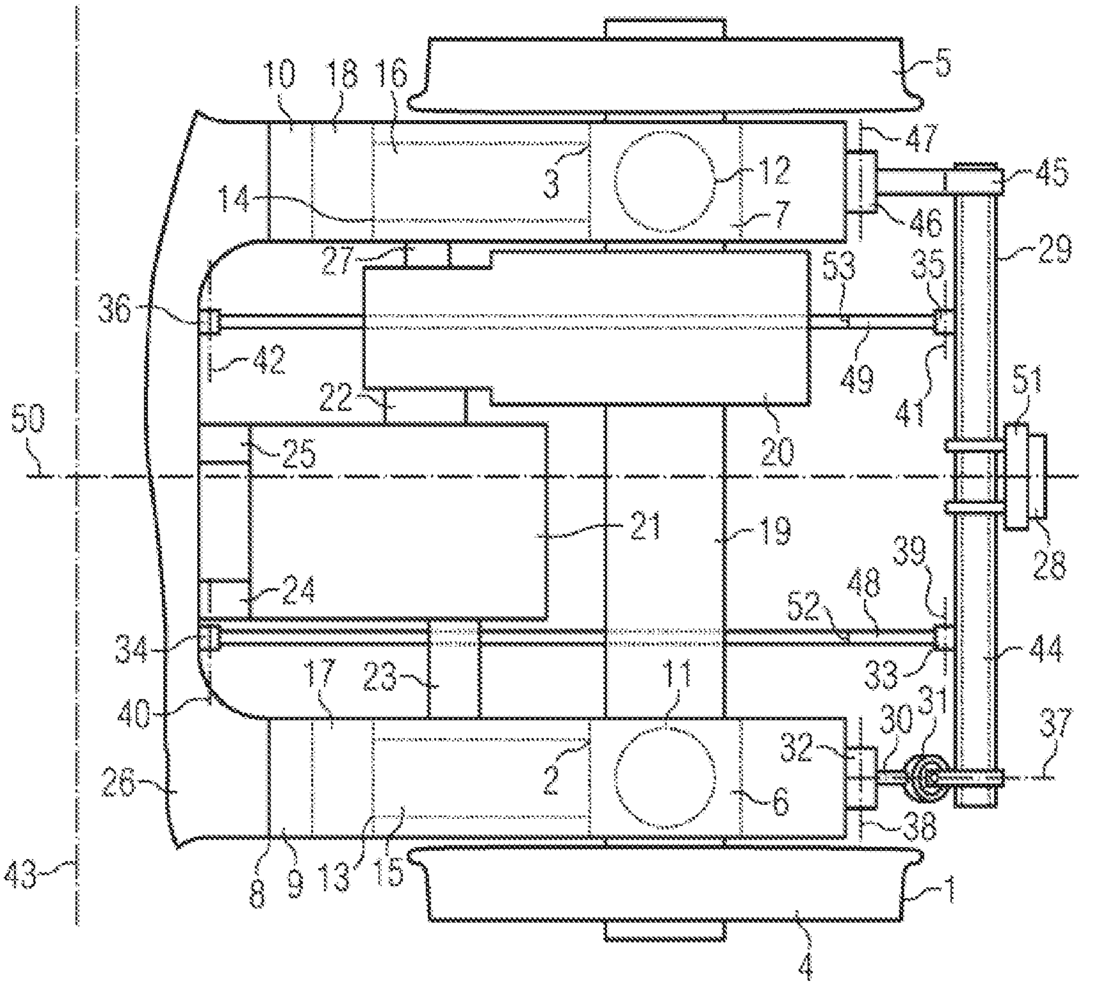
FIG. 2 shows a detail of a bogie of a rail vehicle in a schematic plan view with an exemplary second embodiment of an inventive carrier assembly, which is supported on a crossmember of a bogie frame.

FIG. 2 shows a detail of a bogie of a rail vehicle with an exemplary second embodiment of an inventive carrier assembly as a plan view in a schematic representation, which is similar to that bogie and to that carrier assembly shown in FIG. 1. The same reference numerals are used in FIG. 2 therefore as in FIG. 1.

In contrast to FIG. 1, the carrier assembly of FIG. 2 has a carrier apparatus 29 that is supported in an articulated and elastic manner on a crossmember 26 of a bogie frame 8 via a first support 48 and a second support 49. The first support 48 and the second support 49 are structurally similar and in terms of connection identical to that first support 48 and to that second support 49, which are represented in FIG. 1, and are oriented parallel to a bogie longitudinal axis 50. In contrast to FIG. 1, the first support 48 and the second support 49 of FIG. 2 are arranged offset in the direction of the center of the carrier apparatus 29.

A further difference from FIG. 1 is that the first support 48 and the second support 49 are angled. The first support 48 has a first angle 52, and the second support 49 has a second angle 53. As a result, the first support 48 and the second support 49 are guided obliquely downwards from the carrier apparatus 29. Starting from the first angle 52, the first support 48 extends below a wheel set shaft 19 of the bogie and below a first engine mount 23, via which a first drive motor 21 of the bogie is connected to the bogie frame 8, to the crossmember 26.

Starting from the second angle 53, the second support 49 extends below the wheel set shaft 19 and below a first transmission 20 of the bogie to the crossmember 26.

Inventively, it is also conceivable for the first support 48 and the second support 49 not to be angled but rather curved.

Figure 3:
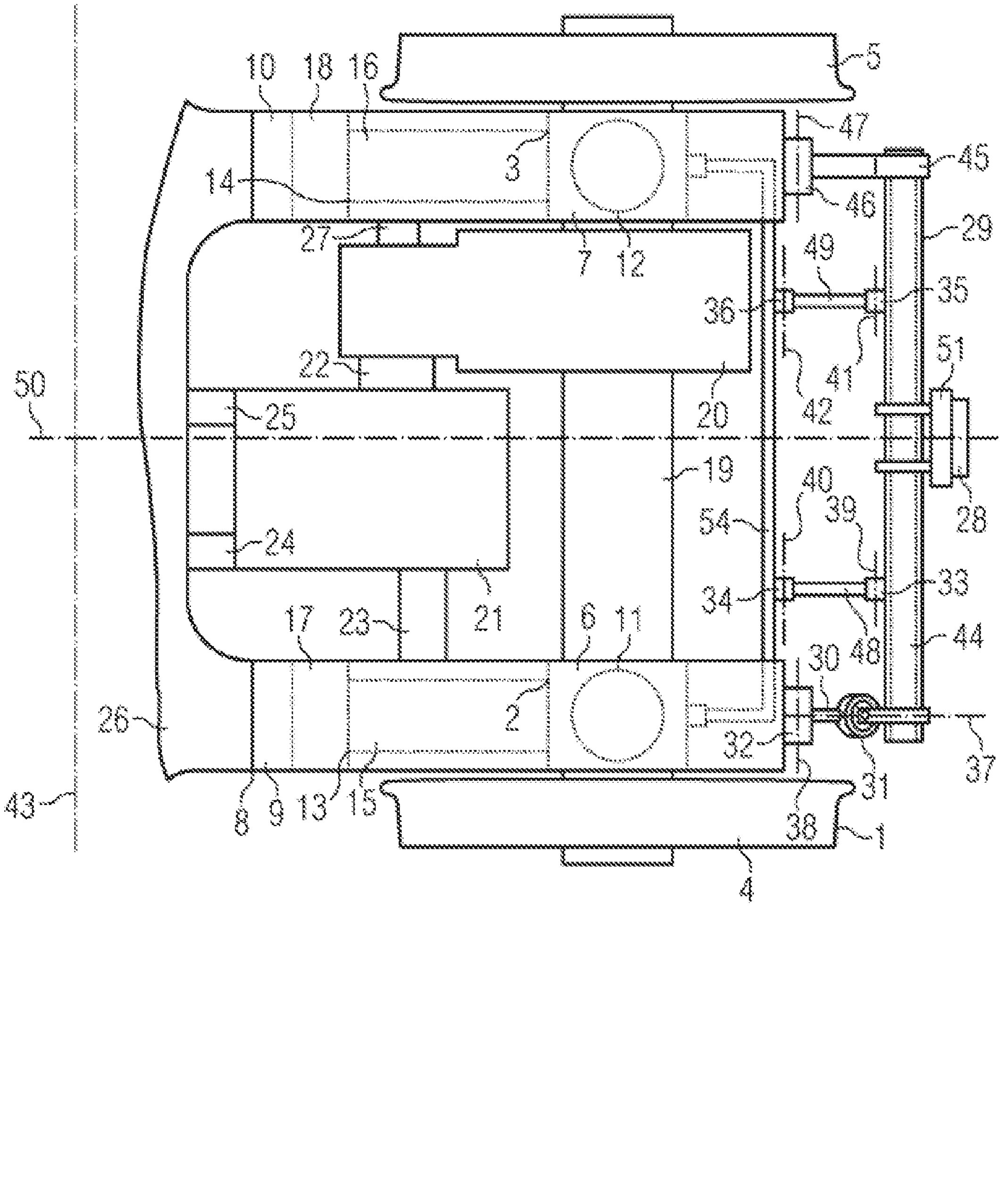
FIG. 3 shows a detail of a bogie of a rail vehicle in a schematic plan view with an exemplary third embodiment variant of an inventive carrier assembly, which is supported on an anti-roll support.

FIG. 3 shows a detail of a bogie of a rail vehicle with an exemplary third embodiment of an inventive carrier assembly as a schematic plan view, which are similar to that bogie and to that carrier assembly which are disclosed in FIG. 1 and FIG. 2. The same reference numerals are used in FIG. 3 therefore as in FIG. 1 and FIG. 2.

In contrast to FIG. 1 and FIG. 2, the bogie in FIG. 3 has an anti-roll support 54, which is formed as a metal torsion spring, is oriented parallel to a bogie transverse axis 43 and is rigidly coupled to a first wheel set bearing housing 6 and to a second wheel set bearing housing 7 of the bogie.

A first support 48 and a second support 49, which are connected to a carrier assembly 29 of the carrier assembly, are supported on the anti-roll support 54, that is to say, on a bogie component.

The first support 48 and the second support 49 are structurally similar and in terms of connection identical to that first support 48 and to that second support 49 shown in FIG. 1. In comparison with FIG. 1, the first support 48 and the second support 49 of FIG. 3 have shorter lengths and are arranged offset in the direction of the center of the carrier apparatus 29.

The carrier assembly 29 is articulated and elastically supported on the anti-roll support 54 via the first support 48 and the second support 49, which are oriented parallel to a bogie longitudinal axis 50.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A carrier assembly for a bogie of a rail vehicle which is connectable to a bogie frame, the carrier assembly comprising:

a carrier apparatus which is connectable in an articulated and elastic manner to at least one first longitudinal member of the bogie frame and additionally supportable in an articulated and elastic manner on at least the bogie frame or on at least one further bogie component;

a pendulum support, the carrier apparatus being connectable to the at least one first longitudinal member via the pendulum support, the carrier apparatus being L-shaped, and a first leg of the carrier apparatus being connectable to the at least one first longitudinal member via the pendulum support.

2. The carrier assembly as claimed in claim 1, wherein the first leg is tubular and permanently connected to a second leg of the carrier apparatus formed as a rocker.

3. The carrier assembly as claimed in claim 1, wherein the pendulum support is connected to the carrier apparatus via a first pivot joint and is connectable to the at least first longitudinal member via a second pivot joint.

4. The carrier assembly as claimed in claim 3, wherein a first joint longitudinal axis of the first pivot joint is arranged at a right angle to a second joint longitudinal axis of the second pivot joint.

5. The carrier assembly as claimed in claim 1, wherein the carrier apparatus is connectable to the at least first longitudinal member in an articulated manner with respect to a bogie transverse axis.

6. The carrier assembly as claimed in claim 1, wherein the carrier apparatus is one of supported on the bogie frame and supported on the further bogie component along a direction of a bogie longitudinal axis.

7. The carrier assembly as claimed in claim 1, wherein the carrier apparatus is supportable on at least one first wheel set bearing housing of the bogie via at least one first support.

8. The carrier assembly as claimed in claim 7, wherein the at least first support includes a third pivot joint at a first end and a fourth pivot joint at a second end.

9. The carrier assembly as claimed in claim 8, wherein the at least first support has an angled or curved configuration.

10. The carrier assembly as claimed in claim 7, wherein the at least first support has an angled or curved configuration.

11. The carrier assembly as claimed in claim 1, wherein the carrier apparatus is supportable on a crossmember of the bogie frame via at least one first support.

12. The carrier assembly as claimed in claim 11, wherein the at least first support includes a third pivot joint at a first end and a fourth pivot joint at a second end.

13. The carrier assembly as claimed in claim 11, wherein the at least first support has an angled or curved configuration.

14. The carrier assembly as claimed in claim 1, wherein the carrier apparatus is supportable on an anti-roll support of the rail vehicle via at least one first support.

15. The carrier assembly as claimed in claim 14, wherein the at least first support includes a third pivot joint at a first end and a fourth pivot joint at a second end.

16. The carrier assembly as claimed in claim 14, wherein the at least first support has an angled or curved configuration.

17. The carrier assembly as claimed in claim 1, wherein the carrier apparatus is connectable in an articulated and elastic manner to a second longitudinal member of the bogie frame; and wherein a second leg of the carrier apparatus is connectable to the second longitudinal member via an elastic element.

18. The carrier assembly as claimed in claim 1, wherein the carrier assembly comprises an antenna carrier assembly.

19. A bogie of a rail vehicle having the carrier assembly as claimed in claim 1.

* * * * *